(12) United States Patent
Suzuki et al.

(10) Patent No.: US 11,194,154 B2
(45) Date of Patent: Dec. 7, 2021

(54) ONBOARD DISPLAY CONTROL APPARATUS

(71) Applicant: DENSO CORPORATION, Kariya (JP)

(72) Inventors: Takamitsu Suzuki, Kariya (JP); Masayuki Kondo, Kariya (JP)

(73) Assignee: DENSO CORPORATION, Kariya (JP)

( * ) Notice: Subject to any disclaimer, the term of this patent is extended or adjusted under 35 U.S.C. 154(b) by 327 days.

(21) Appl. No.: 16/375,898

(22) Filed: Apr. 5, 2019

(65) Prior Publication Data
US 2019/0235241 A1 Aug. 1, 2019

Related U.S. Application Data

(63) Continuation of application No. PCT/JP2017/036483, filed on Oct. 6, 2017.

(30) Foreign Application Priority Data

Oct. 7, 2016 (JP) .............................. JP2016-199185

(51) Int. Cl.
G02B 27/01 (2006.01)
B60K 35/00 (2006.01)
(Continued)

(52) U.S. Cl.
CPC .......... *G02B 27/0101* (2013.01); *B60K 35/00* (2013.01); *B60R 11/02* (2013.01);
(Continued)

(58) Field of Classification Search
CPC ................ G02B 27/0101; G02B 27/01; G02B 2027/014; G02B 2027/0183;
(Continued)

(56) References Cited

U.S. PATENT DOCUMENTS

2010/0164702 A1 7/2010 Sasaki et al.
2012/0008048 A1 1/2012 Sekine et al.
(Continued)

FOREIGN PATENT DOCUMENTS

JP S60-131328 A 7/1985
JP H07257228 A 10/1995
(Continued)

*Primary Examiner* — Brandi N Thomas
(74) *Attorney, Agent, or Firm* — Harness, Dickey & Pierce, P.L.C.

(57) ABSTRACT

An onboard display control apparatus mounted on a vehicle and controlling a head-up display displaying information is provided. The onboard display apparatus includes: a space information acquisition section that acquires information representing a position of an object in front of the vehicle; an eye point information acquisition section that acquires information representing a position of an eye; a display controller that determines a display mode of a display image, causing the display image to be displayed and overlapped with a specific target in a visual field of a driver; an output section that provides the display image in accordance with the display mode. The display controller adjusts the display mode of the display image based on information representing behavior of the vehicle, information representing a property of an external environment, or information representing physical ability of the driver.

12 Claims, 3 Drawing Sheets

(51) Int. Cl.
*G06F 3/01* (2006.01)
*B60R 11/04* (2006.01)
*B60R 11/02* (2006.01)

(52) U.S. Cl.
CPC .............. *B60R 11/04* (2013.01); *G02B 27/01* (2013.01); *G06F 3/013* (2013.01); *B60K 2370/334* (2019.05)

(58) Field of Classification Search
CPC ........ G02B 27/0179; G02B 2027/0181; G02B 13/06; G02B 2027/0141; G02B 27/0149; G02B 2027/0118; G02B 2027/0127; G02B 2027/0161; G02B 2027/0185; G02B 2027/0198; G02B 26/0816; G02B 27/017; G02B 27/288; G02B 6/00; G02B 2027/011; G02B 2027/0112; G02B 2027/0154; G02B 2027/0187; G02B 26/0833; G02B 26/101; G02B 27/0093; G02B 27/646; G02B 5/10; G02B 5/208; B60R 1/00; B60R 300/105; B60R 2300/607; B60R 2300/806; B60R 2300/30; B60R 2300/207; B60R 2300/40; B60R 11/02; B60R 16/023; B60R 2300/303; B60R 2300/802; B60R 21/0134; B60R 2300/205; B60R 2300/302; B60R 2300/70; B60R 2300/8006; B60R 2300/8093; B60R 11/0235; B60R 11/04; B60R 1/04; B60R 1/087; B60R 1/12; B60R 2001/1223; B60R 2011/0005; B60R 2011/0043; B60R 2011/0085; B60R 2011/0092; B60R 2021/0006; B60R 2021/01013; B60R 2021/01304; B60R 21/013; B60R 21/01554; B60R 21/02; B60R 2300/306; B60R 2300/605

See application file for complete search history.

(56) References Cited

U.S. PATENT DOCUMENTS

2012/0256812 A1* 10/2012 Aoki ...................... B60K 35/00
345/7
2016/0216521 A1* 7/2016 Yachida ............. G02B 27/0179

FOREIGN PATENT DOCUMENTS

| JP | 2002159011 A | 5/2002 |
|---|---|---|
| JP | 2005207777 A | 8/2005 |
| JP | 2005322143 A | 11/2005 |
| JP | 2010156608 A | 7/2010 |
| JP | 2012-032811 A | 2/2012 |
| JP | 2013047021 A | 3/2013 |
| JP | 2013-237320 A | 11/2013 |
| JP | 2015080988 A | 4/2015 |
| JP | 2017094882 A | 6/2017 |

* cited by examiner

ONBOARD DISPLAY CONTROL APPARATUS

CROSS REFERENCE TO RELATED APPLICATIONS

The present application is a continuation application of International Patent Application No. PCT/JP2017/036483 filed on Oct. 6, 2017, which designated the United States and claims the benefit of priority from Japanese Patent Application No. 2016-199185 filed on Oct. 7, 2016. The entire disclosures of all of the above applications are incorporated herein by reference.

TECHNICAL FIELD

The present disclosure relates to an onboard display control apparatus.

BACKGROUND

A head-up display (HUD) in a vehicle forms a display image in a vehicle's forward view of a driver of a vehicle based on a virtual image, so that display information is displayed in a direction of a visual line of the driver. In an augmented reality employing the HUD mounted on the vehicle, for example, information may overlap with a real scenery viewed through a windshield of the vehicle. The real scenery recognized by the driver is augmented.

SUMMARY

The present disclosure provides an onboard display control apparatus that may be mounted on a vehicle and may control a head-up display. The onboard display apparatus may determine a display mode of a display image, the display mode including at least a position in which the display image may be projected, causing the display image to be displayed and overlapped with a specific target in a visual field of a driver. The onboard display apparatus may provide the display image by the head-up display in accordance with the display mode. The onboard display apparatus may perform a relation control that adjusts the display mode of the display image.

BRIEF DESCRIPTION OF DRAWINGS

The above and other objects, features and advantages of the present disclosure will become more apparent from the following detailed description made with reference to the accompanying drawings. In the drawings.

DETAILED DESCRIPTION

Figure 1:
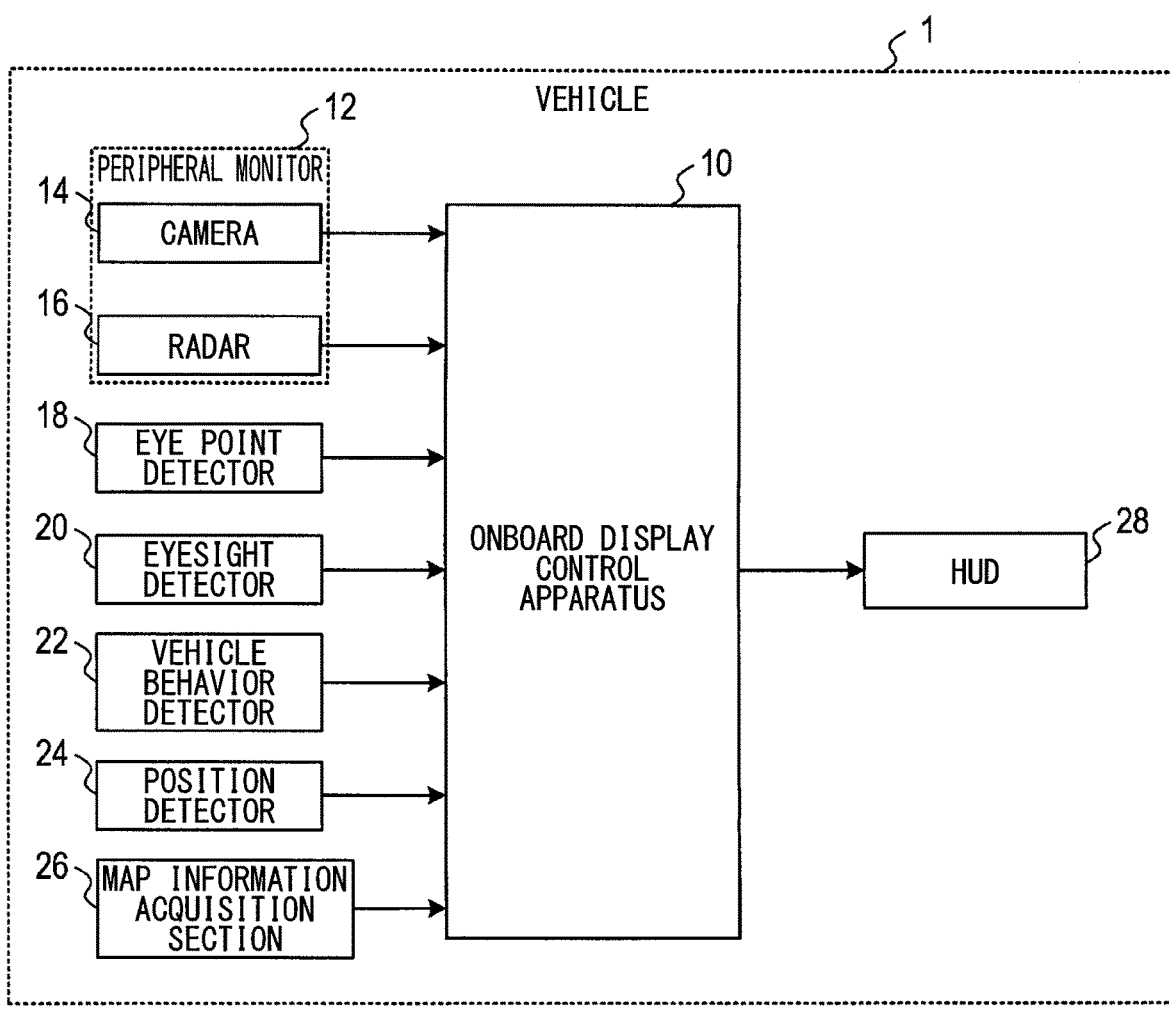
FIG. 1 is a block diagram showing a configuration of an onboard display system according to an embodiment.

A head-up display forms a display image in a forward view of a driver of a vehicle based on a virtual image to display information in a direction of a visual line of the driver. The head-up display may be referred to as a HUD. As a practical example of the HUD mounted on the vehicle, an augmented reality is proposed. In the augmented reality employing the HUD mounted on the vehicle, for example, information overlaps with a real scenery viewed through a windshield of the vehicle. The real scenery recognized by the driver is augmented. One example may display a symbol such as an arrow showing a direction in which a subject vehicle may proceed at a crossing point corresponding to a shape of road in the real scenery. Alternatively, the driver may be attracted by an attention of highlighting a road sign that the driver does not view.

A position of a face of the driver in the vehicle may not be fixed. The position of the face of the driver changes, so that a position of the real scenery and a position of the display image of the HUD may deviate from each other in the view of the driver. Therefore, an advantage by an overlapping display may be not achieved. Furthermore, when the display image of the HUD may not be displayed at an appropriate position, the driver may feel discomfort or wrongly understand.

A comparative example proposes a technique in which the position of the eye of the driver is detected and the display image is image-formed in a straight line obtained by connecting the positions of the eyes of the driver with a guidance route. The display image of the HUD is displayed at an appropriate position.

However, as a result of detailed examination by the inventors of the present application, the inventors found followings. A factor causing display image of the HUD to be displayed with deviating from a real scenery is not limited to a factor regarding to a face position of the driver. The inventors found a possibility that deviation between the display image of the HUD and the real scenery occurs due to various factors regarding to, for example, rapid changes of behavior of a vehicle, a property of an external environment, physical abilities of the driver, or the like. In addition, the inventors found that incompatibility between the display image of the HUD and the real scenery occurs due to these factors, and the driver may feel discomfort.

According to one situation of the present disclosure, it may be required to provide a technique to appropriately display the display image of the HUD, in order to address the various factors generating the discomfort and the deviation between the display image of the HUD and the real scenery. According to one aspect of the present disclosure, the onboard display control apparatus controls the head-up display. The head-up display displays information as the display image obtained based on the virtual image recognized in a forward view of the driver. The information is required to be displayed for the driver of the vehicle. The onboard display control apparatus includes a space information acquisition section, an eye point information acquisition section, a display controller, and an output section.

The space information acquisition section is configured to acquire information representing a position of an object existing in a real scenery in front of the vehicle in an absolute coordinate system. The eye point information acquisition section is configured to acquire information representing a position of the eye of the driver. The display controller is configured to determine a display mode of the display image based on position information of the object and position information of the eye. Specifically, the display controller determines the display mode of the display image including at least one position where the display image is projected so that the display image is displayed overlapping with a specific target in the visual field of the driver. The output section is configured to form the display image in the head-up display according to the display mode determined by the display controller.

The display controller is configured to perform at least one control of behavior relation control, in which the display controller adjusts the display mode of the display image based on information representing a behavior of the vehicle, environment relation control in which the display controller adjusts the display mode of the display image based on the information representing a property of the external environment, or physical ability relation control in which the display controller adjusts the display mode of the display image based on the information representing a physical ability of the driver.

According to the onboard display control apparatus of the present disclosure, it may be possible to adjust the display mode of the display image corresponding to the various factors causing the discomfort and the deviation between the display image of the HUD and the real scenery. Therefore, it may be possible to reduce the incompatibility and the discomfort for the display image in the HUD.

Hereinafter, embodiments of the present disclosure are described with reference to the drawings. The present disclosure is not limited to the embodiments described bellows, and can be provided according to various aspects.

[Description of Configuration of Onboard Display System]

A configuration of the onboard display system in the embodiment is described with reference to FIG. 1. The onboard display system shows information to a driver by employing a HUD. The onboard display system is mounted on a vehicle 1. As illustrated in FIG. 1, the onboard display system includes an onboard display control apparatus 10 and each portion connected to the onboard display control apparatus 10. The onboard display control apparatus 10 is connected to a peripheral monitor 12, an eye point detector 18, an eyesight detector 20, a vehicle behavior detector 22, a position detector 24, a map information acquisition section 26, and a head-up display projector 28 (also referred to as a HUD projector).

The onboard display control apparatus 10 corresponds to an information process apparatus mainly including a CPU, a semiconductor memory such as a RAM, a ROM, a flash memory, and an input-to-output interface, or the like (not shown). The HUD projector 28 forms a display image obtained based on a virtual image in a forward visual field of the driver. The onboard display control apparatus 10 displays information to overlap with a real scenery viewed by the driver through the windshield placed on a forward in a driver sheet of the vehicle 1.

The onboard display control apparatus 10 is provided by, for example, a microcontroller or the like in which functions as a computer system are concentrated. The function of the onboard display control apparatus 10 is implemented by the CPU executing a program stored in a tangible storage medium such as the ROM or the semiconductor memory. The number of microcontrollers configuring the onboard display control apparatus 10 may be one or more. A method implementing a function of the onboard display control apparatus 10 is not limited to software. A part of or all of elements of the method may be implemented by employing a hardware obtained by a combination of a logic circuit, an analog circuit, or the like.

The peripheral monitor 12 corresponds to an optical or electromagnetic sensor for recognizing a forward scenery of the vehicle 1. The peripheral monitor 12 includes, for example, a camera 14 and a radar 16. The camera 14 photographs a forward area viewed through the windshield of the vehicle 1, and outputs data of a photographed picture image to the onboard display control apparatus 10. The radar 16 transmits an electric wave or a laser light to the forward area common with a photographed range of the camera 14, and receives a reflection wave. The radar 16 detects presence or absence of the target, or a distance to the target. In addition to the camera 14 and the radar 16, a target sensor such as an infrared sensor or an ultrasonic sensor may be employed as the peripheral monitor 12.

The eye point detector 18 corresponds to a sensor having a function of detecting the position of a driver's eye. As the eye point detector 18, for example, a camera system having a function of measuring a coordinate of the position of the driver's eye in a viewpoint vehicle coordinate system or the like can be employed. The camera system, for example, executes a picture image process to a picture image of the driver's eye photographed by an infrared camera. The camera system detects the position coordinate of the driver's eye in the vehicle coordinate system.

The eyesight detector 20 detects a state of eyesight of the driver. As a specific example of the eyesight detector 20, the function of an autorefractometer may be provided in cooperation with a general driver status monitor that recognizes a face picture image of the driver by the infrared camera and a computer. The autorefractometer corresponds to a general measurement instrument that emits the infrared light to the eye of a subject, and automatically analyzes and measures an inflection status, a presence or absence or a degree of myopia, hyperopia, astigmatism, or the like of the eye.

The vehicle behavior detector 22 detects a physical amount showing behavior of the vehicle 1. The vehicle behavior detector 22 includes a gyroscope, a suspension stroke sensor, a vehicle height sensor, a vehicle wheel speed sensor, an acceleration sensor, or the like. The position detector 24 detects a current position of the vehicle 1 based on a detection result obtained by a GPS receiver, the gyroscope, the vehicle speed sensor, or the like.

The map information acquisition section 26 acquires topography data including information that represents topography or a road shape in an absolute coordinate system. The map information acquisition section 26 outputs the acquired topography data to the onboard display control apparatus 10. The topography data acquired by the map information acquisition section 26 may be recorded in a map information storage medium mounted on the vehicle 1. The topography data may be acquired by communication with the external device.

The HUD projector 28 corresponds to a display device that projects light configuring information to be displayed to the driver on the windshield. The HUD projector 28 forms the display image by the virtual image in the forward visual field of the driver. As the HUD projector 28, for example, a projector having a structure can be appropriately employed. In the structure, a display panel for displaying the projected picture image information directly faces the windshield as a projection surface. Alternatively, a projector having a structure can be appropriately employed. In the structure, the picture image information is projected from the display panel through an optical system including mirrors, lenses, or the like.

The onboard display control apparatus 10 controls a position where the display image is projected based on a position of the object recognized by the peripheral monitor 12 and the position of the driver's eye. Specifically, the onboard display control apparatus 10 projects the display image so that the display image of the HUD is displayed overlapping with the specific target in the view of the driver. The onboard display control apparatus 10 is configured to perform control for appropriately displaying the display image of the HUD with respect to the following factors (1) to (7).

(1) Factors Regarding to Vehicle Behavior

The HUD is displayed in a mechanism attached to the vehicle. Therefore, when a rapid change of pitch, roll, yaw, or the like for the vehicle occur, the driver may receive adverse effect such as HUD sickness or the like caused by blurring of the display image or the like. Such the adverse effect may be remarkable when a focal distance of the display image of the HUD is long. It may be presumed that recognition of the discomfort in a brain of the driver causes a situation where the adverse effect may be remarkable. The recognition is caused by sudden deviation between the display image and the real scenery in a state where a visual line of the driver matches with the real scenery viewed through the windshield and in a state where the display image of the HUD is displayed overlapping with the real scenery.

(2) Factors Regarding to Variations of Overlapping Target

For example, as one of cases, it is assumed that a symbol indicating a division of a traveling lane or the like is displayed overlapping with a road surface. A shape of the display image of the HUD and a shape of the overlapping target in a real scenery are not matched, due to the variations or deformations such as unevennesses on the road surface. Therefore, the deviation of the display may occur. The deviation between the display image of the HUD and the real scenery occurs due to the deformations of the shape of the overlapping target. The HUD sickness or the like may be triggered.

(3) Factors Regarding to Human Adaptation to Vehicle Behavior

Regarding change of vehicle behavior, the driver can adapt to periodical orientation changes by adjusting posture when, for example, traveling on a bank or a slope being a constant gradient. When the driver can adapt, it may be required to adjust the display mode of the HUD separately from the change of the behavior caused by the factor of (1) described above.

(4) Factors Regarding to Compatibility Between Display Image of HUD and Property of Environment The display image of the HUD is semitransparently displayed in a scenery. Therefore, the variations for appearance may occur corresponding to the property such as, for example, a weather, color of an environment light, brightness of the environment light, color of the overlapping target, or prospect.

(5) Factors Regarding to Physical Ability of Driver

An individual difference for the physical ability of the driver may cause a difference in the appearance of the display image by the HUD. For example, regarding to the eyesight as one of the physical abilities of the driver, the appropriate focal distance to perform image-forming of the display image by the HUD may be different corresponding to a case where the driver has a tendency of the myopia or a case where the driver has a tendency of the hyperopia.

(6) Consideration for Incompleteness of Countermeasures

A system performing countermeasures against the factors of (1) to (5) has a process limit. Therefore, devisal may be required on a precondition that the countermeasures are incomplete.

(7) Consideration for Reduction of Process Load

The process performing the countermeasures against the factors (1) to (5) involves coordinate transformation multiple times even in a single process. The process for the countermeasure may often occur. Therefore, the process load of the system may increase. The system providing a high process ability directly involves a high cost. Therefore, devisal for reducing the process load is essential.

[Description of Procedure of Display Control Process]

The CPU of the onboard display control apparatus 10 executes a procedure of the display control process in accordance with a program. The procedure is described with reference to a flowchart of FIG. 2. The display control process is repeatedly executed for each predetermined control cycle.

Figure 3:
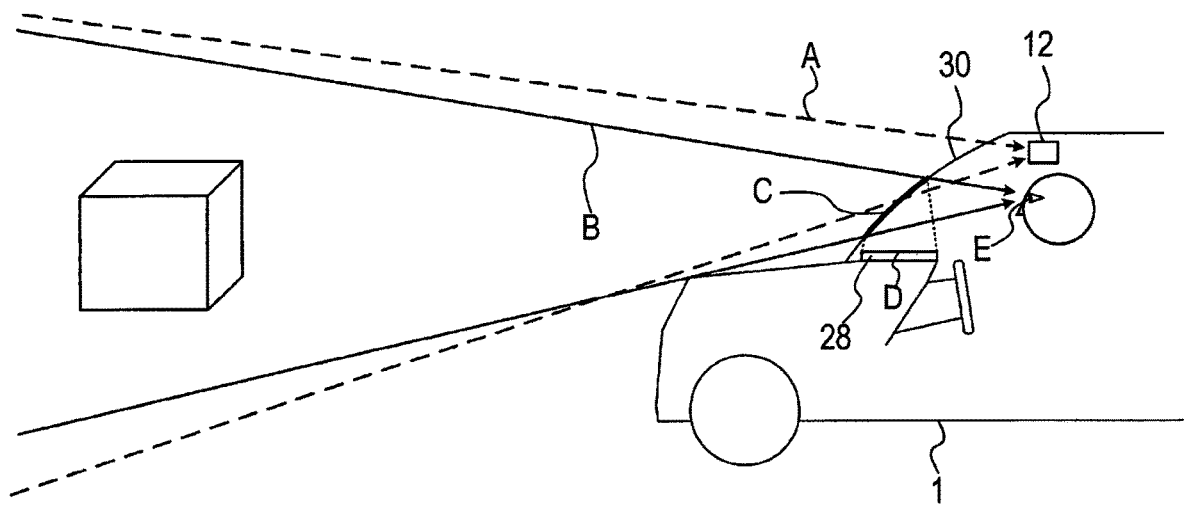
FIG. 3 is an explanatory view illustrating a relation among a view of a peripheral monitor, a view of a driver, a HUD projection surface, and a HUD display surface.

In S100, the onboard display control apparatus 10 acquires three-dimensional information of the forward scenery from the viewpoint position of the peripheral monitor 12. Specifically, as illustrated in FIG. 3, the onboard display control apparatus 10 acquires a coordinate of the three-dimensional target in the absolute coordinate system in a visual field space A. The visual field space A is a view field with reference to the viewpoint position (that is, an installation position) of the peripheral monitor 12.

A method acquiring the coordinate in the absolute coordinate system of the three-dimensional target is described as following. As a first method, the onboard display control apparatus 10 calculates the coordinate in the visual field space A based on the information including the picture image acquired by the camera 14 of the peripheral monitor 12 and/or the information detected by the radar 16. According to the first method, in cooperation with the vehicle behavior detector 22, the coordinate in the visual field space A is calculated based on the known parameter of the peripheral monitor 12 and the information acquired by the peripheral monitor 12. The known parameter represents ground height, attachment angle, or the like of the peripheral monitor 12. The information is acquired by the peripheral monitor 12 in a state where a fluctuation of pitch, roll, or yaw does not occur. Even in a case where the pitch of the vehicle 1 fluctuates, when frequency of the fluctuation is equal to or less than a specified position, it is determined that the fluctuation of the pitch does not occur, and the pitch is set to a target for calculation of the coordinate by the first method.

As a second method, the onboard display control apparatus 10 calculates the coordinate in the visual field space A based on the topography data in peripheral of the current position acquired by the map information acquisition section 26. As a precondition, the topography data includes the coordinate of the target such as the topography or the road that is recorded in the absolute coordinate system. The onboard display control apparatus 10 calculates the coordinate in the visual field space A based on the coordinate represented by the acquired topography data, the coordinate of the current position of the vehicle 1 detected by the position detector 24, and the known parameter showing the ground height, the attachment angle, or the like of the peripheral monitor 12.

However, the second method cannot acquire the three-dimensional information regarding to a movement object such as a vehicle. Therefore, basically, the first method may be employed when the precondition is set to that the movement object is targeted for overlapping with the display of the display image of the HUD. According to the first method, the movement object may be a monitoring target. Therefore, when the fluctuation of the pitch, the roll, the yaw, or the like occurs, the coordinate is untargeted for monitoring. The untargeted coordinate is predicted based on coordinates previously monitored at multiple times.

Figure 2:
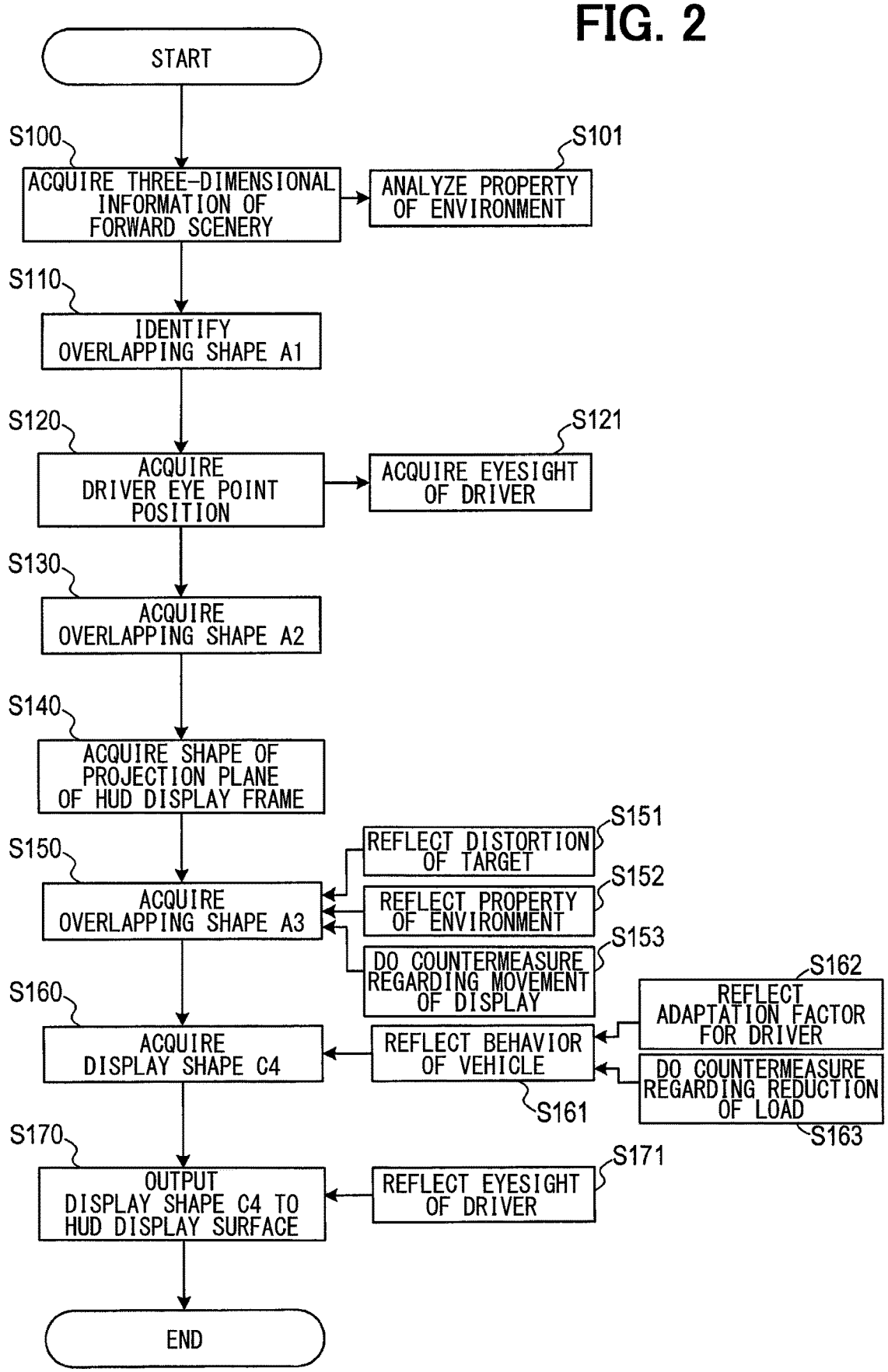
FIG. 2 is a flowchart showing a procedure of a display control process.

The description returns to the flowchart of FIG. 2. In S101, the onboard display control apparatus 10 analyzes the property of the environment, regarding to the information acquired by the peripheral monitor 12 in S100. Specifically, the onboard display control apparatus 10 executes the picture image process to the picture image information of the camera 14. The onboard display control apparatus 10 recognizes the brightness of the environment light, the color of the environment light, the weather (for example, rain or snow), the color of the overlapping target (for example, the color of the vehicle) and visibility of the overlapping target. S101 corresponds to the process regarding to the countermeasure against "(4) Factors regarding to compatibility between display image of HUD and property of environment".

In S110, the onboard display control apparatus 10 identifies an overlapping shape A1 based on the three-dimensional information acquired in S100. The overlapping shape A1 has a position and a shape in the visual field space A of the display image required to be displayed overlapping with the specific overlapping target. Specifically, the onboard display control apparatus 10 detects the specific overlapping target based on the information of the scenery previously acquired by the peripheral monitor 12. The overlapping target is, for example, such as a lane marking marked on the road, a forward vehicle, and a road sign. The position and the shape of the display image in the coordinate system in the visual field space A are identified as the overlapping shape A1. When identifying as the overlapping shape A1, the display image corresponding to the detected overlapping target is viewed from the viewpoint of the peripheral monitor 12 so as to overlap with the position of the overlapping target.

In S120, the onboard display control apparatus 10 acquires the position of the eye as an eye point position of the driver based on the information acquired by the eye point detector 18. Specifically, the onboard display control apparatus 10 acquires the eye point position of the driver as the coordinate in a relative coordinate system with reference to the attachment position of the infrared camera configuring the eye point detector 18 or the predetermined position in the vehicle 1.

In S121, the onboard display control apparatus 10 acquires the information representing the eyesight of the driver based on the detection result by the eyesight detector 20. Specifically, the onboard display control apparatus 10 acquires the presence or the absence of the myopia, the hyperopia, the astigmatism, or the like, the degree of the myopia, the hyperopia, the astigmatism or the like, or the refraction state of the eye, as information representing the eyesight of the driver. S121 corresponds to the process regarding to the countermeasure against "(5) Factors regarding to physical ability of driver". When omitting to address the change of the eyesight changing every moment, it is unnecessary to periodically execute the process in S121. It may be configured to execute the process in S121 only first time. Instead of actually measuring the eyesight by the eyesight detector 20, it may be configured to read and acquire the information of the eyesight of the driver, the information being registered in advance.

In S130, the onboard display control apparatus 10 acquires an overlapping shape A2 corresponding to the visual field space B of the driver based on the overlapping shape A1 identified in S110. A visual field space B is a visual field with reference to a start point position E of the driver, as illustrated in FIG. 3. Specifically, the onboard display control apparatus 10 transforms the coordinate of the overlapping shape A1 identified in S110 into the coordinate system with reference to the eye point position of the driver acquired in S120. The overlapping shape A2 is calculated.

The overlapping shape A2 shows a position and a shape of the display image in the visual field space B. For example, a method of a general view transformation may be employed as the transformation of the coordinate. The view transformation is a projection method for transferring the position of the eye point viewing a diagram into another position in the three-dimensional space, and for representing a diagram viewed from another position. In other words, the view transformation is a coordinate transformation that transfers the diagram into the coordinate viewed from the position of the eye point and a direction of the eye point (that is, a viewpoint coordinate system). Specifically, the view transformation is implemented by a combination of a first coordinate transformation and a second coordinate transformation. The first coordinate transformation translates the position of the diagram in parallel corresponding to the coordinate of the eye point by using a parallel transformation matrix. The second coordinate transformation rotates the diagram toward the eye point by using a rotation transformation matrix. The coordinate transformation identifies the overlapping shape A2 so that the display image of the HUD viewed from the eye point of the driver is displayed overlapping with the overlapping target.

In S140, the onboard display control apparatus 10 acquires the position and the shape in a projection plane space C of a display frame. The display frame shows a predetermined range where the display image can be displayed corresponding to the displacement of the overlapping target. The display frame is drawn so as to surround the display image. As shown in FIG. 3, the projection plane space C is a coordinate system allocated to a range where movie light output from the HUD projector 28 is projected on the windshield 30 of the vehicle 1.

In S150, the onboard display control apparatus 10 acquires an overlapping shape A3 corresponding to the projection plane space C based on the overlapping shape A2 acquired in S130. Specifically, the onboard display control apparatus 10 performs the coordinate transformation of the coordinate of the overlapping shape A2. The coordinate of the overlapping shape A2 is transformed along a projection line connecting the eye point position of the driver to the overlapping shape A2 into a two-dimensional coordinate system allocated on the windshield. The onboard display control apparatus 10 calculates the overlapping shape A3 indicating the position and the shape of the display image in the projection plane space C. For example, as the coordinate transformation, a method projecting the overlapping shape A2 having three coordinates on a virtual plane in the two-dimensional coordinate system by a general perspective projection may be employed. The perspective projection corresponds to a projection method for drawing on the two-dimensional plane such that the three-dimensional object is viewed. That is, according to the perspective projection, an apparent size of the object is inversely proportional to a distance. Specifically, when the eye point is an origin and the visual line is in a negative direction of a z axis perpendicular to a x-y plane, a point at (x, y, z) is projected on a point at ($-Ax/z$, $-Ay/z$) obtained by transferring the eye point for $-A$ in the forward direction. In the step S150, the onboard display control apparatus 10 is configured to correct the display mode of the overlapping shape A3 by executing each of processes of S151, S152, and S153.

In S151, the onboard display control apparatus 10 reflects the distortion of the overlapping target on the display mode of the overlapping shape A3. S151 corresponds to the process regarding to the countermeasure against "(2) Factors regarding to variations of overlapping targets". Specifically, it is described as following.

For example, it is described of a case where the display image of HUD is displayed overlapping with the lane marking that divides the traveling lane on the road. From a standpoint of road maintenance, the lane marking marked on the road is generally drawn so as not to cause a sharp change with use of a straight line, a clothoid curve, or the like in order not to cause a sudden change in the behavior of the vehicle traveling along the traveling lane. Generally, the display image of the HUD is set to an expression too, the display image being displayed overlapping with the lane marking. The expression is obtained by transforming the predetermined diagram including the straight line, the clothoid curve, or the like into a shape corresponding to the eye point of the driver.

However, a road surface on which the lane marking or the like is marked is not necessarily a plane without distortion. The road surface may have unevenness or distortion. In such a case, the deviation of the position or the shape may occur between the real scenery and the display image of the HUD. Therefore, the onboard display control apparatus 10 recognizes the shape of a ground surface by employing the radar, the camera, an ultrasonic sensor, the infrared sensor, or the like. The overlapping shape A3 is transformed corresponding to the distortion or the variation of the ground surface when the recognized ground surface has the distortion or the variation of the shape that exceeds a permissible value. The displaying of the HUD matches with the real scenery and continues even when the ground surface has the distortion and the variation. In other words, the onboard display control apparatus 10 displays the display image including a symbol complementing the real scenery in the visual field of the driver even when recognizing that visibility regarding the external environment is low. However, when degree of distortion of the overlapping target is so high, the distortion may become severe in such a state where the meaning as information is not represented by deforming the display image of the HUD corresponding to the distortion of the overlapping target. As a countermeasure against a case where the distortion may become severe, an upper limit of the distortion is set to the display image of the HUD. However, when the upper limit of the distortion is merely set, the deviation may occur again between the real scenery and the display image.

Therefore, the onboard display control apparatus 10 sets to a reference point, a crossing point of a line towards a direction where the vehicle proceeds from an eye point position of the driver and a horizontal line intersect each other. The onboard display control apparatus 10 gradually increases the upper limit of the distortion corresponding to the distance from the reference point. In other words, a predetermined permissible range is set to be variable in accordance with a distance from a predetermined reference position in the visual field of the driver to the position of the display image. It may be possible to accurately transmit information of the HUD in peripheral of the center of the visual field of the driver. It may be possible to reduce the deviation between the real scenery and the display image of the HUD in peripheral of the visual field of the driver.

In S152, the onboard display control apparatus 10 reflects the property of the environment on the display mode of the overlapping shape A3. S152 corresponds to the process regarding to the countermeasure against "(4) Factors regarding to compatibility between display image of HUD and property of environment". Specifically, it is described as following.

The onboard display control apparatus 10 corrects the display mode of the overlapping shape A3 corresponding to the analysis result of the environment information in S101. Specifically, the onboard display control apparatus 10 determines the color of the overlapping target. The onboard display control apparatus 10 emphasizes a contrast by setting the color of the display image of the HUD to a color different from the overlapping target. For example, when the overlapping target is a white vehicle, the onboard display control apparatus 10 sets the color of the display image of the HUD to yellow. When information representing a warning overlaps with a yellow vehicle, the onboard display control apparatus 10 employs another color such as a complementary color of yellow instead of employing yellow as the display image of the HUD.

The onboard display control apparatus 10 determines the color of the environment light or the weather, and adjusts the color of the display image of the HUD corresponding to the environment. For example, at the time of snowfall, the onboard display control apparatus 10 changes an original white display to another color. Further, when the environment light looks red due to a sunset or the like, the onboard display control apparatus 10 renders a realistic feeling by adding redness to the display image of the HUD.

Furthermore, when determining that the visibility of the overlapping target is in a low situation based on the analysis result of the environment information, the onboard display control apparatus 10 may be configured to perform a display simulating the shape of the overlapping target its self by the display image of the HUD. It may be possible to complement the visibility of the overlapping target. Specifically, it is assumed of a situation where the visibility is low due to rainfall, fog, or the like. In the situation, the onboard display control apparatus 10 performs a display simulating the traveling lane itself when the overlapping display of the HUD is performed on the precondition that the lane marking exists in the traveling lane. It may be possible to provide the effective augmented reality without depending on a state of the visibility.

In S153, the onboard display control apparatus 10 performs the countermeasure regarding to a movement expression of the display image of the HUD. S153 corresponds to the process regarding to "(6) Consideration for incompleteness of countermeasures". Specifically, it is described as following.

When the countermeasure is incomplete due to the process limit of the system, a process complementing the incompleteness is executed. It may be possible to reduce the incompleteness. For example, it may be desired to correct the position of the display image of the HUD at a refresh rate equal to or faster than a rate at which a human can dynamically and real-timely recognize. However, a certain system may be difficult to provide a high-speed process such that the position of the display image of the HUD is corrected at a fast refresh rate. In this case, the onboard display control apparatus 10 executes the entire display control process at an executable cycle. In addition, the onboard display control apparatus 10 adds an afterimage expression when moving the display image of the HUD. The driver can perceive the movement of the display image of the HUD as a smooth movement. It may be possible to perceive the effect of reducing burden on the eye of the driver.

When moving the position of the display image in a situation where a displayable area of the HUD is limited, a part of the display image may be out of the displayable area for the display image due to the movement. Therefore, the onboard display control apparatus 10 sets a margin portion on an outer peripheral portion of the displayable area of the HUD. The margin portion corresponds to a margin for preventing the part of the display image from being out of the displayable area of the HUD. The onboard display control apparatus 10 generates the overlapping shape A3 that is a base of the display image of the HUD so that the display image is included in the displayable area excluding the margin portion. It may be possible to prevent the part of the display image of the HUD from being out of the displayable area even when the display image of the HUD moves. The outer peripheral portion may be referred to as an outer edge.

It may suddenly occur that the display of the HUD is difficult to track the overlapping target due to a movement or the like. Therefore, it may be effective to perform the following countermeasure. That is, the onboard display control apparatus 10 includes a determination method detecting a delay. The onboard display control apparatus 10 does not update the display itself during the process, when detecting the delay of the occurrence.

In S160, the onboard display control apparatus 10 acquires a display shape C4 corresponding to a display plane space D of the HUD projector 28 based on the overlapping shape A3 acquired in S150. As illustrated in FIG. 3, the display plane space D corresponds to a two-dimensional coordinate system allocated to the picture image display area on a display panel of the HUD projector 28. Specifically, the onboard display control apparatus 10 transforms the two-dimensional coordinate of the overlapping shape A3 into the two-dimensional coordinate of the display plane space D corresponding to the property such as curvature of the projection plane space C, a refractive index of an optical path of the HUD projector 28, or the like. The onboard display control apparatus 10 calculates the display shape C4 indicating the position and the shape of the display image in the display plane space D. The coordinate transformation is calculated by employing, for example, a transformation matrix between two planes of the projection plane space C and the picture image display area. In S160, the onboard display control apparatus 10 is configured to correct the display mode of the display shape C4 by executing each of processes S161, S162, and S163. That is, the onboard display control apparatus 10 determines the display mode.

In S161, the onboard display control apparatus 10 reflects the change of the behavior of the vehicle 1 on the display mode of the display shape C4. S161 corresponds to the process regarding to the countermeasure against "(1) Factors regarding to vehicle behavior". Specifically, it is described as following.

The onboard display control apparatus 10 detects a vehicle rotation angle such as a pitch angle, a roll angle, or a yaw angle of the vehicle 1, based on the information acquired by the vehicle behavior detector 22, the camera 14, and the radar 16. The onboard display control apparatus 10 estimates a relative position of the vehicle 1 to the real scenery based on the detected vehicle rotation angle together with a detection result of the vehicle wheel sensor, the acceleration sensor, or the like. The onboard display control apparatus 10 estimates the deviation between the real scenery and the display image by the display shape C4 before the correction, based on the estimated relative position. The onboard display control apparatus 10 amends an amount for the deviation. It may maintain the display of the HUD matching with the real scenery even when a temporary behavior occurs in the vehicle 1.

In S162, the onboard display control apparatus 10 reflects an adaptation factor of the driver regarding to the process of S161. S162 corresponds to the process regarding to the countermeasure against "(3) Factors regarding to human adaptation to vehicle behavior". Specifically, it is described as following.

When the pitch of the vehicle 1 constantly inclines in such a case where the vehicle 1 travels on a constant climbing slope or a constant descending slope, the driver can adapt to the slope by adjusting the posture against the slope. Even in a state where the vehicle 1 actually inclines in the pitch direction, it may be possible to hold the visual field of the driver similarly to a state where the pitch angle is 0 degree. Therefore, it is not necessarily required to correct the display mode of the display image of the HUD for all the pitch changes in S161.

Therefore, the onboard display control apparatus 10 analyzes a temporal transition of the pitch angle as a frequency component, and performs a high-pass filter process corresponding to a predetermined lower limit frequency range. The onboard display control apparatus 10 excludes a gentle change of the pitch lower than the frequency range of the high-pass filter from the target for the correction of the display shape C4. In other words, the onboard display control apparatus 10 does not reflect a fluctuation of the pitch representing a frequency lower than a predetermined lower limit frequency on the correction for the position of the display image. It may be possible to reflect the adaptation of the driver corresponding to the gentle change of the pitch on the display mode of the display image of the HUD.

In step S163, the onboard display control apparatus 1 provides the countermeasure for reducing the process load by the process of step S161. S163 corresponds to the process regarding to the countermeasure against "(7) Consideration for reduction of process load". Specifically, it is described as following.

The human visually recognizes the augmented reality by the HUD. The human has a recognizable limit of a frequency (for example, approximately from 30 to 50 Hz) for blinking. Therefore, the onboard display control apparatus 10 does not correct the display shape C4 for a behavior change in a frequency range exceeding the limit.

Specifically, the onboard display control apparatus 10 analyzes a temporal transition of a vehicle orientation such as the pitch angle, the roll angle, and the yaw angle as the frequency component, and performs the high-pass filter process corresponding to a predetermined upper limit frequency range. The onboard display control apparatus 10 does not correct the display shape C4 to the behavior change in a frequency range unrecognizable for the human. The onboard display control apparatus 10 does not reflect a fluctuation of the vehicle rotation angle indicating a frequency higher than the predetermined upper limit frequency on correction for the position of the display image. It may be possible to reduce the process load by omitting the process to the unnecessary behavior change unrecognizable for the human. Alternatively, the onboard display control apparatus 10 may be configured to stop the correction of the display mode or stop the display of the HUD itself in a situation where the driver cannot capture the display image of the HUD even in the peripheral visual field. The configuration may be effective from a standpoint of reducing the process load or power consumption.

In S170, the onboard display control apparatus 10 outputs the display shape C4 acquired in S160 to the display panel of the HUD projector 28. The HUD projector 28 projects the display shape C4 on a windshield 30. The display image recognized in the forward visual field of the driver is formed. In the step S170, the onboard display control apparatus 10 is configured to correct the display mode of the display shape C4 by executing a process of S171.

In S171, the onboard display control apparatus 10 reflects a measurement result of the eyesight of the driver on the display mode of the display shape C4. S171 corresponds to the process regarding to the countermeasure against "(5) Factors regarding to physical ability of driver". Specifically, it is described as following.

Based on the information of the driver's eyesight acquired in S121, the onboard display control apparatus 10 adjusts a distance from the driver to the display image of the HUD and the brightness of the display image of the HUD, corresponding to the quality of the eyesight or the degree of refraction abnormality such as the myopia, the hyperopia, the astigmatism, or the like. It may be possible to deal with the individual differences for each driver or a situation where the eyesight of the same driver changes every moment due to fatigue for the same driver.

The onboard display system of the embodiment described above can provide the following effects, for example. The various factors causing the deviation between the display image of the HUD and the real landscape and the discomfort include the situation such as the behavior of the vehicle, the property of the external environment, or the physical ability of the driver. The onboard display control apparatus 10 may be possible to adjust the display mode of the display image corresponding to the situation. Therefore, it may be possible to reduce the incompatibility and the discomfort of the displayed image in the HUD.

The process of S100 executed by the onboard display control apparatus 10 corresponds to a process as a space information acquisition section. The process of S120 executed by the onboard display control apparatus 10 corresponds to a process as an eye point information acquisition section. The processes of S110, S130, S150 to S153, S160 to S163, and S171 executed by the onboard display control apparatus 10 correspond to the process as a display controller. The process of S170 executed by the onboard display control apparatus 10 corresponds to a process as an output section.

The process of S161 executed by the onboard display control apparatus 10 corresponds to a process as a behavior relation control. The processes of S101, S151, and S152 executed by the onboard display control apparatus 10 correspond to a process as an environment relation control. The processes of S121 and S171 executed by the onboard display control apparatus 10 correspond to a process as a physical ability relation control.

[Modification]

According to the above embodiment, one function of one element may be implemented by multiple elements, or functions of multiple elements may be implemented by one element. A part of the configuration in the embodiment described above may be omitted. At least a part of the configuration of the above embodiment may be added to or replaced with another configuration of the above embodiment, or the like.

The present disclosure can also be provided in various embodiments such as a system that includes the onboard display control apparatus 10 as an element, program that functions a computer as the onboard display control apparatus 10, a tangible storage medium such as the semiconductor memory recording the program, or the display control method.

The invention claimed is:

1. An onboard display control apparatus mounted on a vehicle and configured to control a head-up display displaying information to a driver of the vehicle as a display image provided by a virtual image recognized in a forward visual field of the driver, the onboard display control apparatus comprising:
   a space information acquisition section configured to acquire information representing a position of an object that exists in a real scenery in an absolute coordinate system, in front of the vehicle;
   an eye point information acquisition section configured to acquire information representing a position of an eye of the driver;
   a display controller configured to, based on the position of the object acquired by the space information acquisition section and the position of the eye acquired by the eye point information acquisition section, determine a display mode of the display image, the display mode including at least a position in which the display image is projected, causing the display image to be displayed and overlapped with a specific target in a visual field of the driver; and
   an output section configured to provide the display image by the head-up display in accordance with the display mode determined by the display controller,
   wherein:
   the display controller is configured to perform at least one of
      a behavior relation control that adjusts the display mode of the display image based on information representing behavior of the vehicle,
      an environment relation control that adjusts the display mode of the display image based on information representing a property of an external environment, or
      a physical ability relation control that adjusts the display mode of the display image based on information representing physical ability of the driver,
   in performing the behavior relation control,
   the display controller is configured to estimate a relative position and a relative orientation of the vehicle to the real scenery based on the vehicle rotation angle showing an orientation of the vehicle, and correct a position of the display image based on the estimated relative position and the estimated relative orientation.

2. The onboard display control apparatus according to claim 1, wherein:
   in performing the behavior relation control,
   the display controller is configured to acquire a frequency component of fluctuation of the vehicle rotation angle in a direction of a pitch, and
   the display controller is configured to refrain from reflecting the fluctuation of the pitch showing a frequency lower than a predetermined lower limit frequency on a correction of the position of the display image.

3. The onboard display control apparatus according to claim 1, wherein:
   in performing the behavior relation control,
   the display controller is configured to acquire a frequency component of fluctuation of the vehicle rotation angle, and
   the display controller is configured to refrain from reflecting the fluctuation of the vehicle rotation angle showing a frequency higher than a predetermined upper limit frequency on a correction of the position of the display image.

4. The onboard display control apparatus according to claim 1, wherein:
in performing the environment relation control,
the display controller is configured to recognize a distortion of a shape of a ground surface, which is the specific target, and change the shape of the display image in accordance with the recognized distortion of the ground surface to perform a correction.

5. The onboard display control apparatus according to claim 4, wherein:
in performing the environment relation control,
the display controller is configured to distort the shape of the display image by a degree in a predetermined permissible range to perform the correction; and
the predetermined permissible range is set to be variable in accordance with a distance from a predetermined reference position in the visual field of the driver to the position of the display image.

6. The onboard display control apparatus according to claim 1, wherein:
in performing the environment relation control,
the display controller is configured to recognize brightness, color, and/or weather of the external environment, and correct color of the display image in accordance with the recognized external environment.

7. The onboard display control apparatus according to claim 6, wherein:
in performing the environment relation control,
the display controller is configured to display the display image including a symbol complementing a scenery in the visual field of the driver upon recognizing that visibility regarding the external environment is low.

8. The onboard display control apparatus according to claim 1, wherein:
in performing the physical ability relation control,
the display controller is configured to acquire information representing an eyesight of the driver, and adjust a distance from the position of the eye to the display image in accordance with to the eyesight of the driver.

9. The onboard display control apparatus according to claim 1, wherein:
in response to a control to move the display image, the display controller is configured to additionally perform afterimage expression.

10. The onboard display control apparatus according to claim 1, wherein:
the display controller is configured to set an initial position of the display image within a displayable range of the head-up display while leaving a predetermined margin in an outer edge portion of the displayable range to move the display image.

11. The onboard display control apparatus according to claim 1, wherein:
the display controller is configured to execute a process updating the display mode of the display image for each predetermined control period; and
in response to a delay of the process, the display controller is configured to refrain from updating the display image at a time of the delay of the process.

12. An onboard display control apparatus mounted on a vehicle and configured to control a head-up display displaying information to a driver of the vehicle as a display image provided by a virtual image recognized in a forward visual field of the driver, the onboard display control apparatus comprising:
a microcontroller configured to:
acquire information representing a position of an object that exists in a real scenery in an absolute coordinate system, in front of the vehicle;
acquire information representing a position of an eye of the driver;
determine, based on the acquired position of the object and the acquired position of the eye, a display mode of the display image, the display mode including at least a position in which the display image is projected, causing the display image to be displayed and overlapped with a specific target in a visual field of the driver; and
provide the display image by the head-up display in accordance with the determined display mode,
wherein:
the microcontroller is further configured to perform at least one of
a behavior relation control that adjusts the display mode of the display image based on information representing behavior of the vehicle,
an environment relation control that adjusts the display mode of the display image based on information representing a property of an external environment, or
a physical ability relation control that adjusts the display mode of the display image based on information representing physical ability of the driver,
in performing the behavior relation control,
the microcontroller is configured to estimate a relative position and a relative orientation of the vehicle to the real scenery based on the vehicle rotation angle showing an orientation of the vehicle, and correct a position of the display image based on the estimated relative position and the estimated relative orientation.

* * * * *